United States Patent [19]

Behr

[11] Patent Number: 4,952,053
[45] Date of Patent: Aug. 28, 1990

[54] TRANSPARENCY OVERHEAD PROJECTOR

[75] Inventor: Karl-Günther Behr, Biebertal-Vetzberg, Fed. Rep. of Germany

[73] Assignee: Procent Patent und Verwaltungs AG, Zurich, Switzerland

[21] Appl. No.: 234,592

[22] Filed: Aug. 22, 1988

[51] Int. Cl.$^5$ .............................................. G03B 21/1
[52] U.S. Cl. .................................................... 353/65
[58] Field of Search ...................... 353/65, 77, 78, 99, 353/122, DIG. 3; 350/612, 613, 616, 625, 627

[56] References Cited

U.S. PATENT DOCUMENTS

| | | | |
|---|---|---|---|
| 2,529,664 | 11/1950 | Roysher | 353/24 |
| 2,660,087 | 11/1953 | Domeshek | 353/122 |
| 3,523,721 | 8/1970 | Hofmann | 350/613 |
| 3,752,574 | 8/1973 | Kato et al. | 353/24 |
| 3,752,575 | 8/1973 | Ataka | 353/DIG. 3 |
| 3,877,802 | 4/1975 | Greenspan | 353/98 |
| 4,652,101 | 3/1987 | Grunwald | 353/23 |
| 4,674,850 | 6/1987 | Blom | 350/627 |
| 4,741,613 | 5/1988 | Vanderwerf | 353/DIG. 3 |

FOREIGN PATENT DOCUMENTS 0060934  5/1980  Japan ............. 353/DIG. 3
990930  5/1965  United Kingdom ......... 353/DIG. 3

Primary Examiner—William A. Cuchlinski, Jr.
Assistant Examiner—Patrick R. Scanlon
Attorney, Agent, or Firm—Wells & White

[57] ABSTRACT

The invention concerns a transparency overhead projector having an illumination unit of which the height has been extremely reduced. The main component of the illumination unit is a specular surface comprising mutually parallel, mirrorized prismatic shoulders either on its top or on its lower side, which reflect the light from at least one lateral source toward the Fresnel lens, the platen and the projecting lens. The specular surface may be plane, however it may also be curved in circular, hyperbolic etc. manner in the longitudinal direction of the prismatic shoulders. This curvature may be constant or it may vary. Further, the specular surface also may be twisted, that is, it may also be curved in a direction orthogonal to the prismatic shoulders, and this curvature also may be constant or variable. However the prism angles of the individual prismatic shoulders are always individually determined so that the light shall appear to come from a source which seems to be mounted centrally along the optical axis underneath the Fresnel lens.

6 Claims, 3 Drawing Sheets

TRANSPARENCY OVERHEAD PROJECTOR

CROSS-REFERENCE TO A RELATED APPLICATION

Applicant claims priority under 35 USC 119 for application Ser. No. P 37 28 191.7 filed Aug. 24, 1987 in West Germany.

BACKGROUND OF THE INVENTION

The field of the invention is optics, image projectors having a transparent plate and the invention is particularly concerned with the illuminating unit of a transparency overhead projector.

In conventional transparency overhead projectors, the light source is mounted underneath the projected plane or platen. As a rule the light path from the light source passes through a Fresnel lens underneath the platen and focuses the light through the art work into the projection lens.

The state of the art of the prior art projectors may be ascertained by reference to U.S. Pat. Nos. 2,529,664; 3,752,574 and 4,652,101 the disclosures of which are incorporated herein by reference.

U.S. Pat. No. 4,652,101 discloses in FIG. 1 an overhead projector having a base, a transparent writing plate having on the base, a light source, objective lens and reflector supported above the writing plate, a Fresnel lens disposed below, parallel to and spaced from the writing plate, a reflector below the Fresnel lens, and a frame holding together as a unit the writing plate and Fresnel lens.

In order to achieve uniform illumination of the platen, the light source must be located relatively far from the Fresnel lens so that the light is not incident on it at too large an angle. In turn a minimum height of the projector follows therefrom, which makes such a transparency overhead projector rather bulky. Already many suggestions have been advanced to reduce that height and to create more compact projectors such as shown in U.S. Pat. Nos. 2,529,664 and 3,752,574.

Such suggestions are to the effect of placing the light source to the side fairly tightly underneath the Fresnel lens and to reflect the light by a deflecting mirror mounted below the Fresnel lens toward same and the platen.

SUMMARY OF THE INVENTION

The invention starts from the state of the art. Its object is to create a transparency overhead projector of lesser height than in known projectors with sideways light sources and deflecting mirrors.

This problem is solved by a transparent overhead projector having an illumination unit comprising a light source mounted laterally underneath the Fresnel lens, wherein by a specular surface mounted in stationary manner underneath the platen and comprising mutually parallel mirrorized prismatic shoulders of which the prism angle alpha, i.e., the inclination of the reflecting shoulder surface of the prism, is determined individually for each shoulder and in such a manner that the beams reflected toward the platen appear to come from a central light source present in the optic axis of the apparatus farther below the Fresnel lens.

The large deflection mirror underneath the Fresnel lens is decomposed into a plurality of small strips which are mounted on a plane specular surface. This is best achieved in practice by having these mirror strips being in the form of surfaces of prismatic shoulders which are located mutually parallel on one surface, the specular surface. As a result the space of the deflecting mirror is saved and as a result the height of the illumination unit of such an overhead projector is substantially reduced and the spacing to the Fresnel lens required to let enough light from the light source arrive at the specular surface is determined.

Moreover, even the spacing between the specular surface and the Fresnel lens is minimized further if, not one, but two light sources are used which are mounted laterally and symmetrically relative to the specular surface. Inherently these two light sources may be smaller than where only one is used and nevertheless provide the same light flux. In that case, the prismatic shoulders must be symmetrical by their prism angles to the light sources relative to the central plane of the apparatus defining the optic axis.

The prismatic shoulders may be present both at the top side and the lower side of the specular surface. In the latter case the top side should be made non-specular in order to allow entry to the specular surface of the platen to a maximum of light which then is reflected back by the lower, externally specular prismatic shoulders.

In order to avoid any shadow formation when the light falls on the prismatic shoulders, the invention further provides making the specular surface not plane, but curved in the longitudinal direction of the prismatic shoulders. Concretely, this curved shape may assume several embodiments. The specular surface may be curved in either direction. In one case (when concave toward the platen), this specular surface then forms part of a hollow cylinder with the prismatic shoulders on its inside and in the other case (convex toward the platen), the specular surface amounts to the wall of a nearly full cylinder with the prismatic shoulders on its outside.

The curvature of the specular surface need not be constant (in which case the cross-sectional surface would be circular), instead it may be uneven, for instance more pronounced at the ends than at the center.

Lastly in addition to its curvature, the specular surface may be twisted.

The twisted design is especially significant where only one light source is present underneath the platen. The term "twisting" means that the specular surface is curved not only in the direction of the prismatic shoulders, but also is curved perpendicularly to the direction of these prismatic shoulders. The precise kind of curvature can be found in one of the specific embodiments.

However the prismatic shoulders always extend in the direction of one of the curvatures and the light source, preferably the two symmetrical light sources, mounted on the end faces of the hollow or full cylinders respectively.

The kind and degree of curvature on the one hand and the prism angles of the various prismatic shoulders on the other hand are closely related. The prism angles of all shoulders must individually assume such a value that the light beams as a whole appear to come from a virtual, imaginary light source far below the Fresnel lens, or the platen.

BRIEF DESCRIPTION OF THE DRAWINGS

The attached drawing illustrates the invention by two embodiments wherein:

FIG. 3 is an elevation of FIG. 3 rotated by 90°; and

DESCRIPTION OF THE PREFERRED EMBODIMENTS

Figure 1:
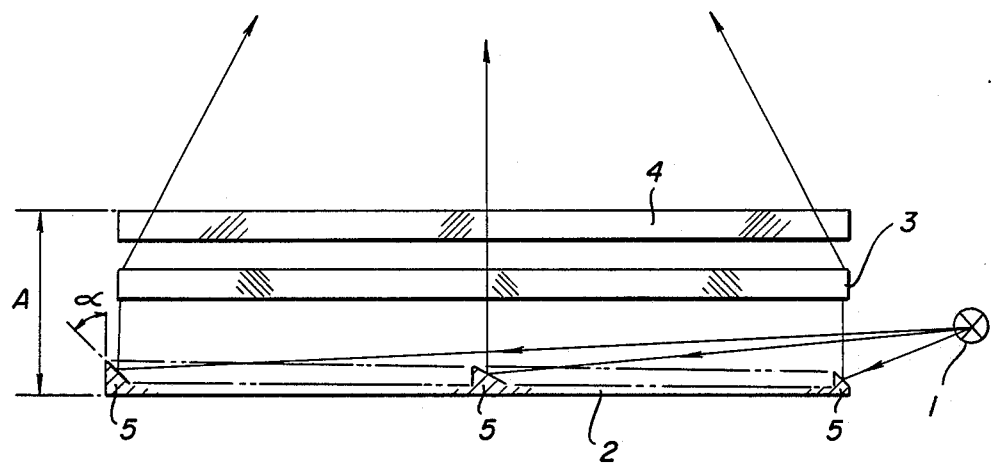
FIG. 1 schematically shows the specular surface of a transparency overhead projector with prismatic shoulders at the top side.

The principle of the specular surface of the invention is shown in its simplest, schematic form in FIG. 1. The light source 1 emits beams incident on the specular surface 2. From there these beams are reflected onto a Fresnel lens 3 and pass through the platen 4 into the (omitted) projection lens.

The specular surface 2 comprises prismatic shoulders at its top side which are perpendicular to the plane of the drawing, whereby the prisms are shown in cross-section in the Figure. The prismatic surfaces facing the light source 1 are mirrorized and the prism angles alpha of each strip are such that the specular, prismatic surfaces reflect the light incident on them toward the Fresnel lens 3 in the manner shown.

FIG. 1 most clearly shows the principle of the specular surface of the invention, which consists in decomposing the large deflection mirror present in the apparatus into individual strips, i.e., the prismatic shoulders, whereby the constructional height A is minimized.

It is clear that when two light sources 1 are used, namely one on each side, the prismatic shoulders will, relatively to their center, be symmetric to the particular light source with their reflecting prismatic surfaces, and further that the prism angles are symmetrically graduated equally from the outside to the inside (or vice-versa).

Figure 2:
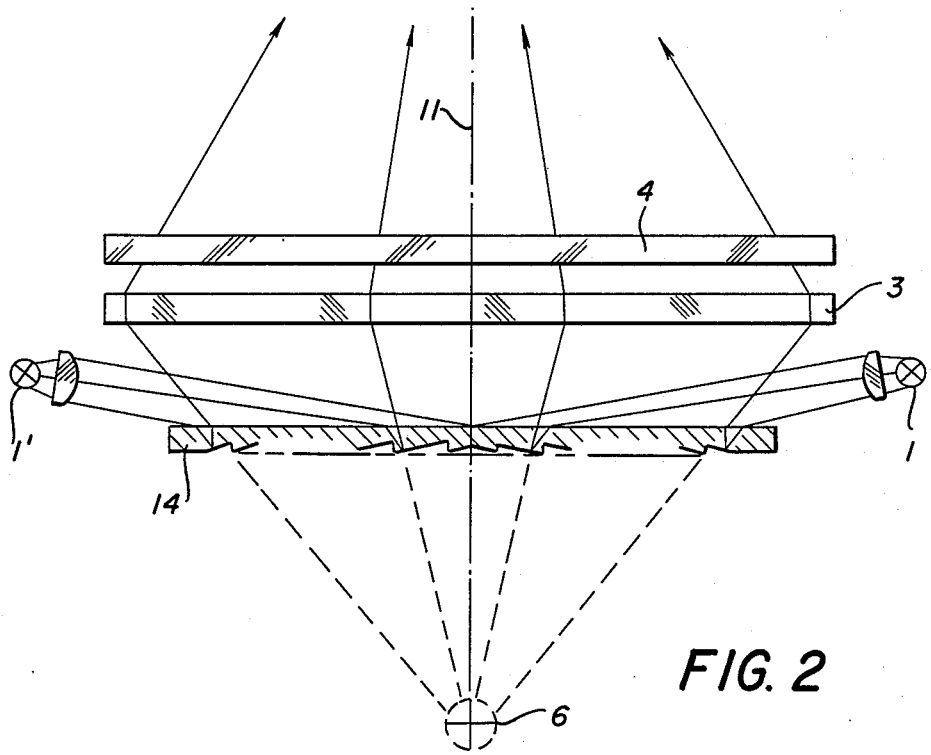
FIG. 2 schematically shows the specular surface of a transparency overhead projector with prismatic shoulders at the lower side.

Such an embodiment is shown in FIG. 2, by the example of a specular surface 14 wherein the prismatic shoulders 5 are present at the lower side of this specular surface. The light passes through the demirrorized top side of the specular surface and is incident at the lower side on the externally mirrorized prismatic shoulders 5 of which the prism angles alpha are such for each shoulder that the light reflected by each all appear to come from a common light source 6 located on the optical axis 11 underneath the Fresnel lens 3.

Figure 3:
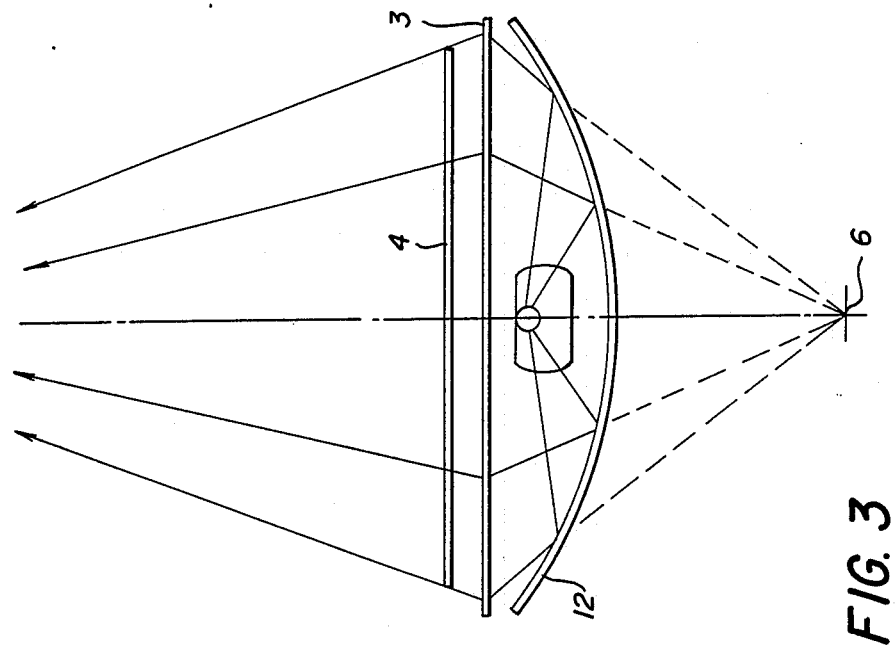
FIG. 3 schematically shows the illumination unit of a transparency overhead projector with a curved specular surface.
Figure 4:
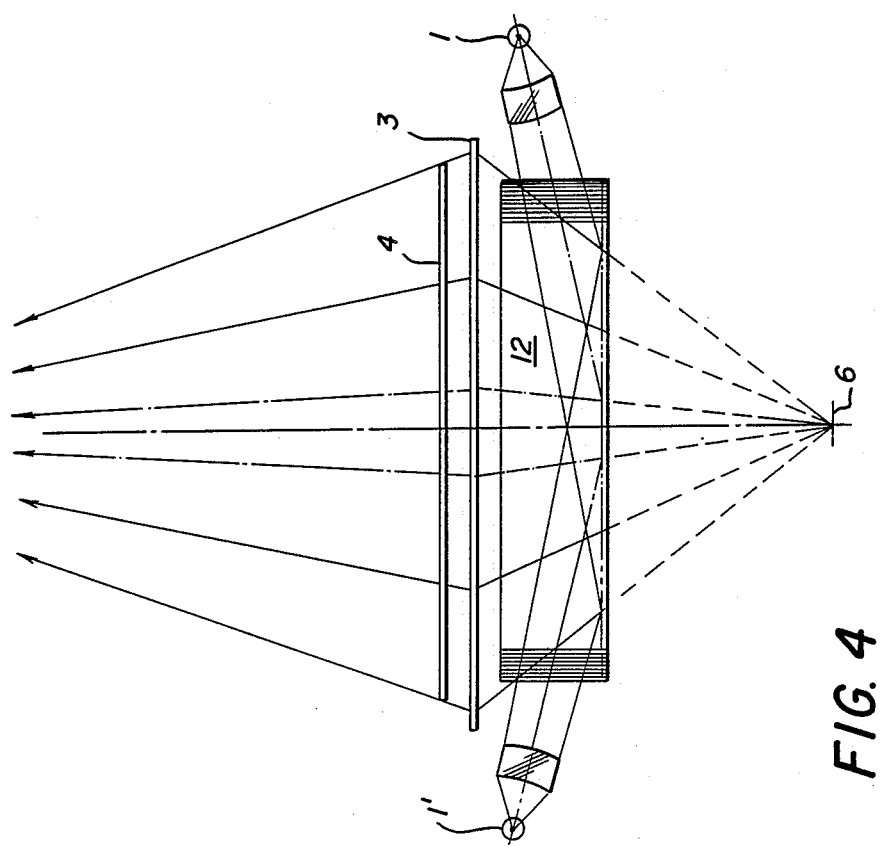

FIGS. 3 and 4 show an embodiment with a curved specular surface 12 where the prismatic shoulders 5 are present at its top in the manner of the embodiment of FIG. 1. As already mentioned, the curvature of the specular surface serves to avoid shading the beam and further to also reflect toward the Fresnel lens those beams which would needlessly scatter into the environment from a plane specular surface.

Again the light source is denoted by 1. The curved specular surface is denoted by 12 and is below the platen 4 and the Fresnel lens 3. There are two light sources 1 and 1', however, only the rear one is shown in FIG. 3. The curvature of the specular surface 12 is shown most clearly in FIG. 3. It must be borne in mind in that in this representation, the viewer looks on the mirrorized prismatic surface of a prismatic shoulder. It will further be noted that the curvature of the specular surface is in the longitudinal direction of the prismatic shoulders.

FIG. 4 is an elevation rotated by 90°. It shows the two light sources 1 and 1' and the curvature of the specular surface 12 is shown by the rearward rise of this surface.

Figure 5:
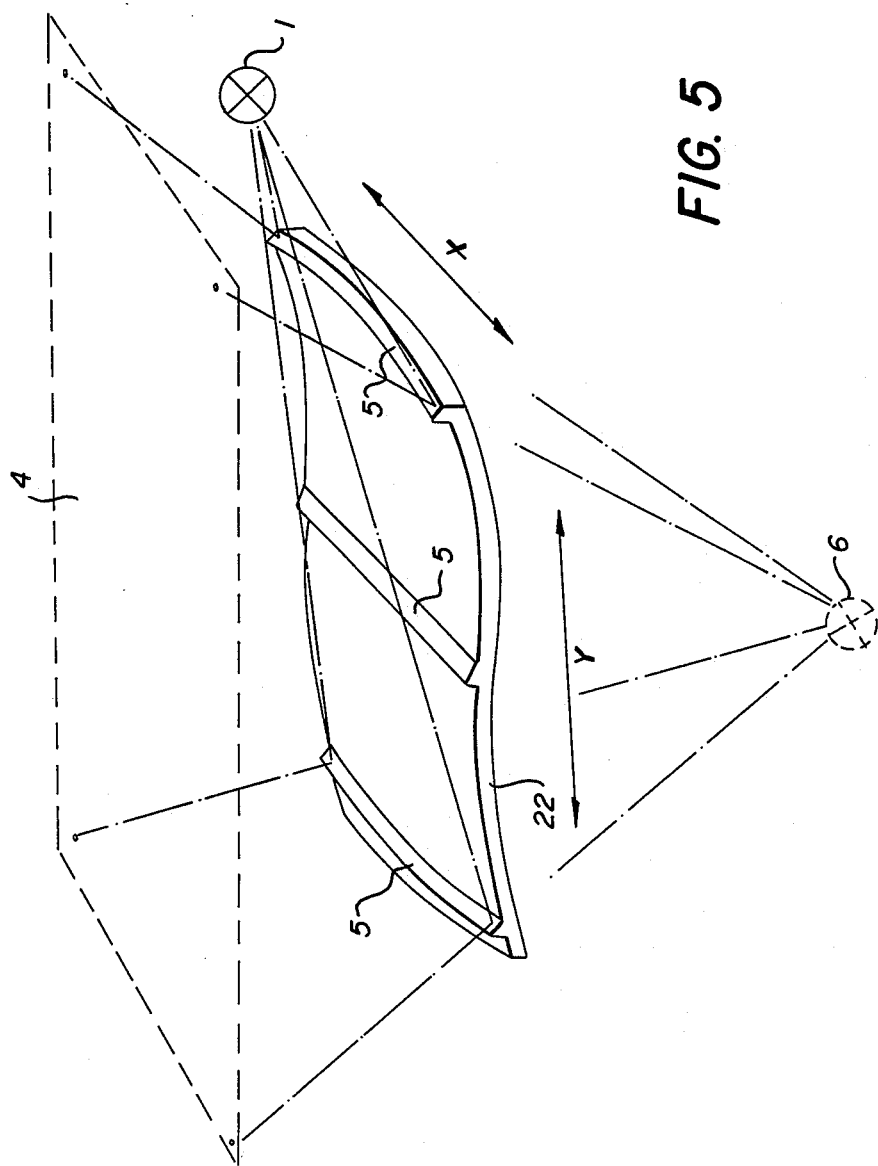
FIG. 5 schematically shows the illumination unit of a transparency overhead projector with a twisted specular surface.

FIG. 5 shows a twisted specular surface 22. This specular surface curves both in the direction of the prismatic shoulders 5 (=x direction) and orthogonally thereto (=y direction). The curvature in the y-direction is not constant, rather it varies from being concave (=right part of the surface), passing through null (=central prismatic shoulder) and becomes convex (=left part of the surface).

In conclusion, it is worth emphasizing that the kinds of curvature of the specular surface shown are merely illustrative. The nature of the curvature (circular, hyperbolic, convex or concave, and further possibly twisted =FIG. 5) can be freely selected. The relation between the nature of the curvature and the prism angles was discussed above. The prism angles always must be selected in such a way that the light beams appear to come from the light source 6 mounted centrally below the Fresnel lens 3.

I claim:

1. An overhead projector having an optical axis, and comprising:

a base;

a light source;

a transparent platen supported on said base along said optical axis;

an objective lens supported above said platen;

a fresnel lens also supported along said optical axis and beneath said platen; and, a specular surface mounted beneath said fresnel lens having mirrorized prismatic shoulders located on a top surface thereof which reflect light from said light source towards said platen and fresnel lens so that said reflected light appears to come from a light source positioned along said optical axis and beneath said fresnel lens, and wherein said specular surface is curved in a first direction with respect to said platen and said curvature is variably concave and convex.

2. An overhead projector as recited in claim 1, wherein:

said specular surface is also curved in a second direction.

3. An overhead projector as recited in claim 2, wherein:

said second direction of curvature is orthogonal to said first direction.

4. An overhead projector as recited in claim 2, wherein:

said curvature in said second direction is not constant.

5. An overhead projector as recited in claim 2, wherein:

said curvature in said second direction is not constant and varies from concave through null to convex.

6. An overhead projector as recited in claim 3, wherein:

said curvature in said second direction is not constant and varies from concave through null to convex.

* * * * *